June 6, 1967 D. W. ROPER 3,323,623
ROTATABLE COUPLING DEVICE
Filed April 20, 1961 3 Sheets-Sheet 2

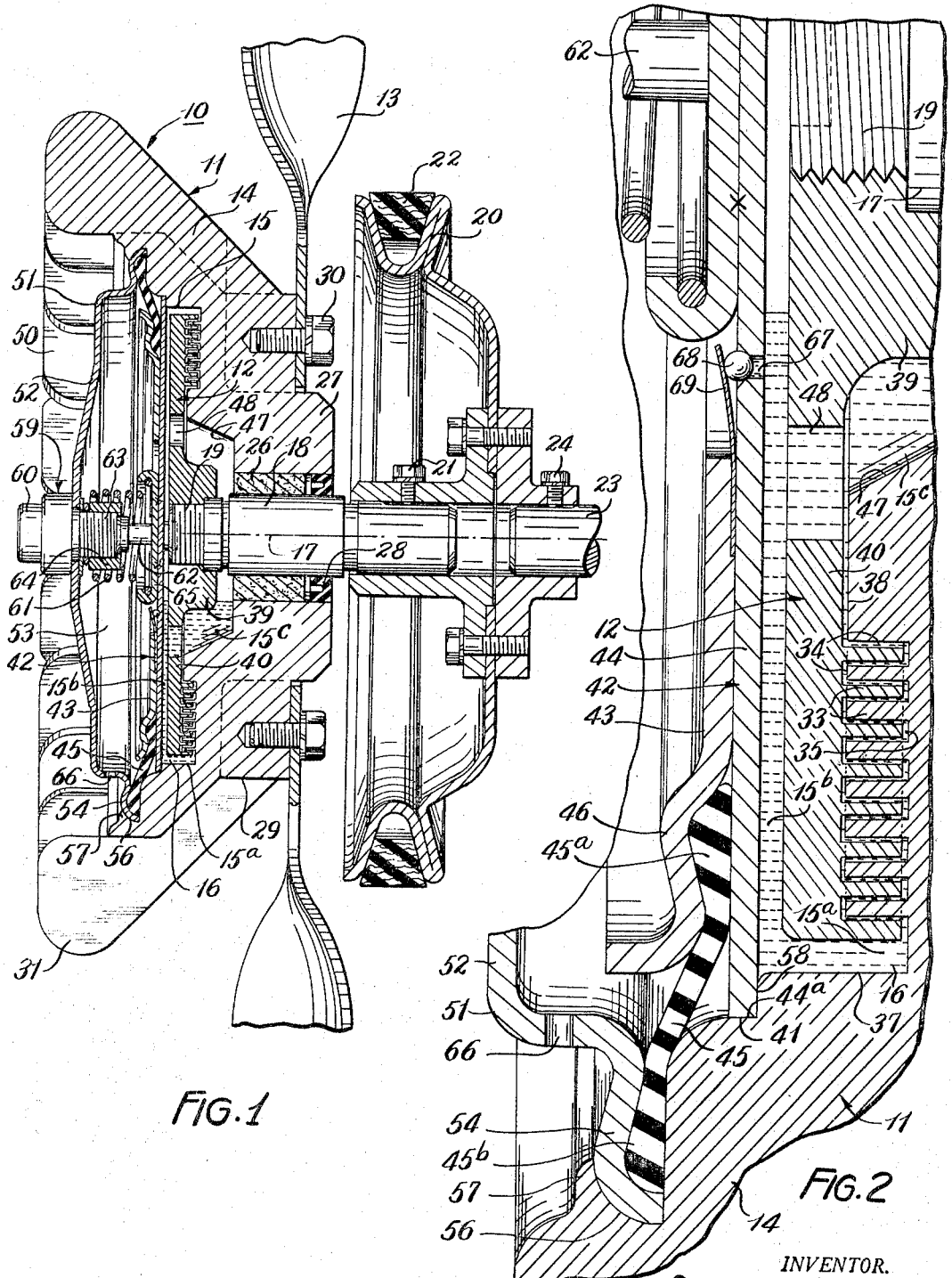

INVENTOR.
DANIEL W. ROPER
BY
Williams, David, Hoffmann & Yount
ATTORNEYS

United States Patent Office 3,323,623
Patented June 6, 1967

3,323,623
ROTATABLE COUPLING DEVICE
Daniel W. Roper, Rochester, Mich., assignor to Eaton Yale & Towne Inc., a corporation of Ohio
Filed Apr. 20, 1961, Ser. No. 104,442
3 Claims. (Cl. 192—58)

This invention relates to rotatable drive couplings of the type containing a viscous shear fluid which is effective between co-operating portions of relatively rotatable coupling members for transmitting torque therebetween. A coupling of this type is usable for driving various kinds of devices and, as one example of a practical use thereof, the coupling of this invention is disclosed herein in conjunction with an engine auxiliary device in the form of the cooling fan of an internal combustion engine.

As one object thereof, this invention provides a novel coupling device of the viscous shear fluid type having relatively rotatable coupling members carrying co-operating coupling elements, and transfer means effective for shifting the fluid so as to vary the co-operation thereof with such elements and correspondingly vary the torque transmitted between the coupling members.

When the control of the amount of torque is achieved by shifting the fluid to vary the effective co-operation thereof with the coupling elements, as provided by this invention, there is no need for any shifting movement of either of the coupling members as has been proposed heretofore and those members can accordingly be mounted and operated in a more stable and satisfactory manner. Moreover, the transfer means needed to produce the desired shifting of the fluid can be relatively simple and will operate in an effective and reliable manner, and is adaptable to automatic control.

As another object thereof, this invention provides a novel viscous fluid coupling device of the character mentioned above and wherein the means for causing the shifting of the fluid for varying the co-operation thereof with the coupling elements comprises transfer means effective on the fluid and movable relative to the housing of the device.

Still another object is to provide a novel construction for such a viscous fluid coupling device wherein the shifting of the fluid is by a movable displacement means operable to cause varying amounts of the fluid to be supplied to the coupling elements in accordance with the torque transmitting action desired therebetween so that a modulating control is achieved for the torque being transmitted.

A further object is to provide a novel construction for such a viscous fluid coupling device wherein the means for causing the shifting of the fluid for varying the co-operation thereof with the coupling elements is actuatable by a temperature responsive means, or by a temperature responsive means in conjunction with a spring means.

Yet another object is to provide a novel viscous fluid coupling device having the coupling elements thereof operable in one chamber portion in a manner so that the fluid is subject to centrifugal action for decreasing the co-operation thereof with such elements, and also having displacement means effective on the fluid in another chamber portion for causing the fluid to be supplied to the elements for increasing the torque transmitted therebetween.

Other objects, novel characteristics and advantages of this invention will be apparent in the following detailed description and in the accompanying drawings forming a part of this specification and in which, FIG. 1 is a vertical axial section taken through a novel viscous fluid coupling device provided by this invention;

FIG. 2 is a partial vertical axial section corresponding with a portion of FIG. 1 and showing such portion on a larger scale;

Figure 3:
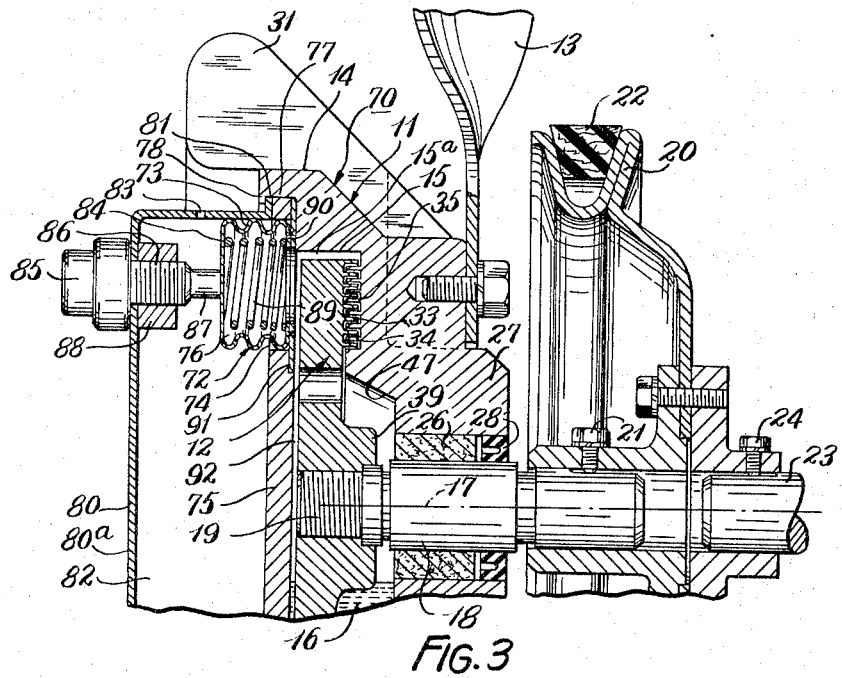
FIGS. 3 and 4 are partial vertical axial sections showing modified forms of the novel coupling device.

As representing one preferred embodiment of the invention, FIGS. 1 and 2 show a rotatable coupling device 10 of the viscous shear fluid type comprising relatively rotatable coupling members 11 and 12, one of which is operable as a power input member and the other of which is operable as a power output member. The coupling device 10 is adaptable for use in driving various kinds of load devices and is here shown as being used to drive an engine auxiliary device, namely a cooling fan 13 of an internal combustion engine.

The coupling member 11 is here shown as being the power output member and comprises a housing 14 having chamber means 15 therein containing the viscous shear fluid 16, and the coupling member 12 is here shown as being the power input member and is located in the chamber means 15. The outer and inner coupling members 11 and 12 are rotatable on a common rotation axis 17 which is also the rotation axis for the load device driven by the power output member, that is, the rotation axis of the fan 13.

The coupling device 10 is here shown as also comprising a power input shaft 18 having a threaded inner end portion 19 projecting into the chamber means 15 and on which the inner coupling member 12 is mounted. The axis 17 is also the rotation axis of the shaft 18. The power supply connection for the input shaft 18 is here shown as being a pulley 20, with which this shaft is connected as by a set screw 21, and which pulley is adapted to be driven from the engine crankshaft as by means of a suitable belt 22. The pulley 20 is shown as also being the drive member for a pump shaft 23 or the like on which the pulley is mounted and secured as by means of a set screw 24.

In addition to providing the driving means for the inner coupling member 12, the power input shaft 18 also serves as a journal member on which the housing 14 is rotatably mounted by a suitable bearing 26 disposed therebetween and located in the hub portion 27 of the housing. A seal is provided for preventing leakage of the fluid 16 from the chamber means 15 and along the shaft 18, and is here shown as comprising a suitable annular packing 28 disposed around the shaft adjacent the rear end of the bearing 26.

The housing 14 is of a suitable size and shape to contain the chamber means 15 and the inner coupling member 12, and also includes an annular mounting portion 29 extending around the hub portion 27 and to which the fan 13 is secured as by means of screws 30. The peripheral portion of the housing 14 is preferably provided with an annular series of heat-radiating blades 31 for dissipating heat which may be generated in the coupling device 10. The chamber means 15 is so formed that it comprises an annular working chamber $15^a$ a first chamber portion, and reservoir chambers $15^b$ and $15^c$ as second and third chamber portions connected with such working chamber. The purpose of the working and reservoir $15^a$, $15^b$ and $15^c$ will appear hereinafter.

Adjacent portions of the coupling members 11 and 12 are provided with co-operating torque transmitting elements comprising interengaged annular ridge and groove elements 33 and 34 formed on these members and disposed in a co-operative relation with intervening space 35 therebetween to accommodate the viscous coupling fluid 16 as a torque transmitting fluid. The ridge and groove elements 33 and 34 are located in the working chamber 15ᵃ and comprise a radially disposed series of these elements lying in a transverse plane extending substantially normal to the rotation axis 17. The ridge and groove elements are relatively rotatable during the operation of the coupling 10 and torque is transmitted between the coupling members 11 and 12 by the resistance to shear offered by the portion of the fluid 16 which is located in the intervening space 35. The coupling fluid 16 can be any suitable viscous shear fluid such as a silicon oil.

The working chamber 15ᵃ is formed by a portion of an inner counterbore 37 of the housing 14, and the alternating groove and ridge elements 34 and 33 of the outer coupling member 14 are formed on the radial transverse end wall 38 of such counterbore. The inner coupling member 12 comprises a hub portion 39 having an internally threaded opening in which the shaft portion 19 is engaged, and a radial disk portion 40 projecting from the hub portion and carrying the alternating ridge and groove elements 33 and 34 of such inner coupling member.

The housing 14 has an outer counterbore providing a cylindrical guide means 41 for a movable fluid transfer means 42 whose purpose will be explained hereinafter. The transfer means 42 is here shown as being a diaphragm-type piston means 43 comprising a disk-shaped plate member 44 having its peripheral edge portion 44ᵃ axially slidable in the cylindrical guide means 41, and a flexible annular diaphragm member 45 connecting the plate member 44 with the housing 14. The piston means 43 also includes an annular clamping member 46 for connecting the piston means with the inner edge portion 45ᵃ of the diaphragm member 45.

The reservoir chamber 15ᵇ lies between the plate member 44 and the radially disposed disk portion 40 of the inner coupling member 12 and is variable in volume by the axial movements of the plate member 44 in the guide means 41. The reservoir chamber 15ᶜ is formed by an axial recess 47 provided in the housing 14 and into which the hub portion 39 of the inner coupling member 12 projects. The reservoir chambers 15ᵇ and 15ᶜ lie on opposite sides of the radial disk portion 40 and communicate through openings 48 provided in such disk portion at locations between the hub portion 39 and the ridge and groove elements 33, 34.

The amount of torque which is transmitted between the ridge and groove elements 33 and 34 will depend upon the amount of the coupling fluid 16 which is present in the intervening space 35, that is, upon the effective area of contact between such fluid and the surfaces of the ridge and groove elements. Variations in the amount of fluid 16 present in the intervening space 35 are produced, as needed, by axial movements of the piston means 43 of the above-mentioned fluid transfer means 42.

When coupling fluid 16 is supplied to the ridge and groove elements 33, 34 so that the intervening space 35 is filed with such fluid for the full radial extent of the series of elements, the amount of torque transmitted between the coupling members 11 and 12 will be a maximum amount. On the other hand when fluid is removed or withdrawn from the space 35 so that this space is filled with fluid for only a portion of the radial extent of the series of elements 33 and 34, only a reduced amount of torque will be transmitted between the coupling members 11 and 12 inasmuch as the coupling effect will depend upon the shear resistance of the fluid in the space 35 and more or less fluid in such space will result in more or less torque being transmitted.

The housing 14 has a front recess 50 extending axially thereinto and includes a cover member 51 located in such recess outwardly of the piston means 43. The cover member 51 is here shown as being of a dished shape with a transverse wall 52 spaced from the piston means 43 so as to provide a chamber 53 therebetween. The cover member 51 also comprises an annular rim portion 54 which serves as a clamping means for the outer peripheral portion 45ᵇ of the diaphragm 45.

The cover member 51 is mounted on the housing 14 by having the rim portion 54 thereof received in an undercut annular groove 56 of the housing. The rim portion 54 is retained in the annular groove 56 by a flange portion 57 of the housing which is spun or otherwise deflected into holding engagement with this rim portion. The clamped engagement of the inner and outer annular edge portions 45ᵃ and 45ᵇ of the diaphragm member 45 with the plate member 44 and the housing 14 prevents leakage of the fluid 16 past the piston means 43.

From the arrangement of the chamber portions 15ᵃ, 15ᵇ and 15ᶜ relative to the series of ridge and groove elements 33, 34 as above described, and the provision for axial movement of the piston means 43 for varying the volume of the chamber portion 15ᵇ, it will be seen that movement of the piston means toward the coupling member 12 will cause fluid 16 to be supplied from the chamber portion 15ᵇ to the space 35 for increasing the effectiveness of the torque transmitting connection between the coupling members. It will thus also be seen that movement of the piston means 43 in a direction away from the coupling member 12 will cause fluid to be removed from the space 35 for decreasing the effectiveness of the torque transmitting connection between the coupling members.

So long as the piston means 43 remains in an inwardly shifted position, the increased amount of fluid thus supplied to the space 35 will be retained therein. The movement of the piston means 43 in the outward direction increases the volume of the chamber portion 15ᵇ so that more or less of the fluid contained in the space 35 flows therefrom into this chamber portion and such flow is produced or assisted by centrifugal force acting on the fluid during the rotation of the coupling device. The centrifugal action thus achieved will be very effective for this return flow purpose by reason of the radial position in which the series of ridge and groove elements 33, 34 is disposed.

In FIGS. 1 and 2 the piston means 43 is shown at the inner end of its axial movement at which time the peripheral portion of the plate member 44 is in engagement with annular stop shoulder 58 formed by the bottom wall of the counterbore 41. The chamber portion 15ᶜ accommodates the portion of the fluid 16 which is in excess of that needed to fill the intervening space 35 when the piston means 43 is in its innermost position.

The coupling device 10 also comprises, as a part of the fluid transfer means 42, an actuating means 59 for producing the above-described movements of the piston means 43. The actuating means 59 is here shown as comprising a conventional thermostat unit 60 of the sealed type and an associated spring means, in this case a tension spring 61. The thermostat unit 60 is mounted on the cover member 51 substantially centrally thereof and has a movable stem 62 projecting in an inward axial direction and effective against the piston means 43. The thermostat unit 60 has a threaded boss 63 thereon extending through an opening of the cover member 51 and secured in such opening as by means of a nut or the like 64 applied to such threaded boss.

The spring 61 has the inner end thereof attached to the piston means 43 by a spring seat 65 mounted on the plate member 44 and having a hollow head in which the end convolution of the spring is engaged and retained. The outer end of the spring 61 is attached to the cover member 51 as by a clamping action applied to the outer end convolution by the securing nut 64 of the thermostat unit 60. The spring 61 is thus effective to continuously exert an outward axial retracting force on the piston means 43. The chamber 53 accommodates the movements of the piston means 43 and also provides a space for the spring 61 and the inner portions of the thermostat unit 60. The chamber 53 is suitably vented to atmosphere as by a vent opening 66 provided therein at a suitable point.

The body portion of the thermostat unit 60 occupies a position outside of the housing 14 so as to be exposed to contact by the stream of heated air leaving the vehicle radiator with which the coupling device 10 and the fan 13 may be associated. Heating of the thermostatic unit 60 produces an inward movement of the actuating stem 62 thereof by which the piston means 43 is pushed toward the inner coupling member 12 in opposition to the tension spring 61 to thereby cause the piston means to displace fluid from the chamber portion 15b into the space 35 in the manner and for the purpose already explained above.

The fluid 16 can be introduced into the chamber means 15 of the coupling device 10 in any suitable manner, such as through an opening 67 provided with the plate member 44. The opening 67 also serves as a vent opening for the escape of air or excess fluid from the chamber means 15 whenever a pressure condition of a given pressure value occurs therein. The opening 67 is normally closed by a valve member 68 urged toward a seated position by a plate spring 69.

From the construction and characteristics of the coupling device 10 as described above and shown in FIGS. 1 and 2 of the drawings, it will be recognized that the functioning of the transfer means 42 will be very effective in conjunction with the action of centrifugal force in varying the amount of fluid 16 in the space 35 for correspondingly varying the torque transmission between the coupling members 11 and 12. The power output coupling member, in this case the outer coupling member 11, will accordingly drive the cooling fan 13 at a speed determined by the extent of actuation of the piston means 43 by the actuating means 59.

FIG. 3 of the drawings shows a coupling device 70 of a type similar to the coupling device 10 but representing a modified construction. The coupling device 70 employs similar outer and inner coupling members 11 and 12 having co-operating ridge and groove coupling elements 33 and 34 thereon, and viscous shear fluid 16 contained in a working chamber 15 of the housing 14 and effective in the intervening space 35 between the coupling elements for transmitting torque from one to the other of the coupling members.

In the modified coupling device 70, however, a different form of fluid transfer means 72 is provided for varying the amount of coupling fluid in the intervening space 35. The transfer means 72 comprises flexible cylinder devices 73 of the bellows type mounted in openings 74 of a cover plate 75 of the housing 14. The bellows devices 73 are located at circumferentially spaced points around the rotation axis 17 so that the chamber 76 of each bellows device is in communication with the working chamber 15 adjacent the center periphery thereof.

The cover plate 75 forms the front wall of the chamber means 15 and is suitably secured in a counterbore 77 of the housing 14 as by means of a deflected annular retaining portion 78 of the housing. An outer cover member 80 of a dish shape is also mounted on the housing 14 with the transverse wall 80a thereof spaced from the cover plate 75. The cover member 80 is suitably attached to the housing 14 as by having a peripheral flange 81 clamped against the peripheral portion of the cover plate 75 by the annular holding portion 78. The recess of the cover member 80 provides a chamber 82 between the cover plate 75 and the transverse wall 80a into which the bellows devices 73 project. The chamber 82 is suitably vented to atmosphere as by means of one or more vent openings 83 in the cover member 80.

Associated with each of the bellows devices 73 is a conventional thermostat unit 85 of the sealed type having a thread mounting stem 86 projecting through an opening of the transverse wall 80a and a movable actuating stem 87 projecting from such mounting stem and having the free end thereof in engagement with the transverse end wall 84 of the bellows device. The thermostat unit 85 is mounted on the transverse wall 80a by a securing nut 88 applied to the mounting stem 86.

The bellows device 73 includes a compression spring 89 located in the chamber 76 thereof and having one end seated against the transverse end wall 84. The other end of the spring is in engagement with an annular spring seat 90 formed in part by the inner end of the bellows device and in part by an auxiliary mounting plate 91 carried by the cover plate 75 and to which auxiliary mounting plate the inner end of the bellows device is brazed or otherwise suitably secured.

The bellows devices 73, together with their associated thermostat units 85 and compression springs 89, constitute the fluid transfer means 72 for varying the amount of coupling fluid 16 in the intervening space 35 between the coupling elements 33 and 34. When the thermostat units 85 are in a relatively cool condition, the actuating stems 87 will be in a retracted position and the bellows devices 73 will be expanded by the springs 89 to thereby enlarge the volume of the working chamber 15a whereupon fluid will be expelled by centrifugal action from the intervening space 35 for decreasing the transmission of torque between the coupling members 11 and 12. The power output member of the device, which in this case is the outer coupling member 11 carrying the cooling fan 13, will thereupon be driven at a slower rate of speed as a result of the fluid shearing action occuring between the coupling members.

When the thermostat units 85 are subjected to heating as by increased temperature of the air leaving the vehicle radiator, the actuating stems 87 will be extended from these devices and will cause contraction of the bellows devices 73 in opposition to the compression springs 89. Such contraction of the bellows devices 73 will expel fluid therefrom into the working chamber 15a and thence into the intervening space 35 to more completely fill such space. The increased amount of fluid in the intervening space 35 causes a greater amount of torque to be transmitted between the coupling members 11 and 12 with the result that the power output coupling member and the cooling fan 13 will be driven at a faster speed.

Figure 4:
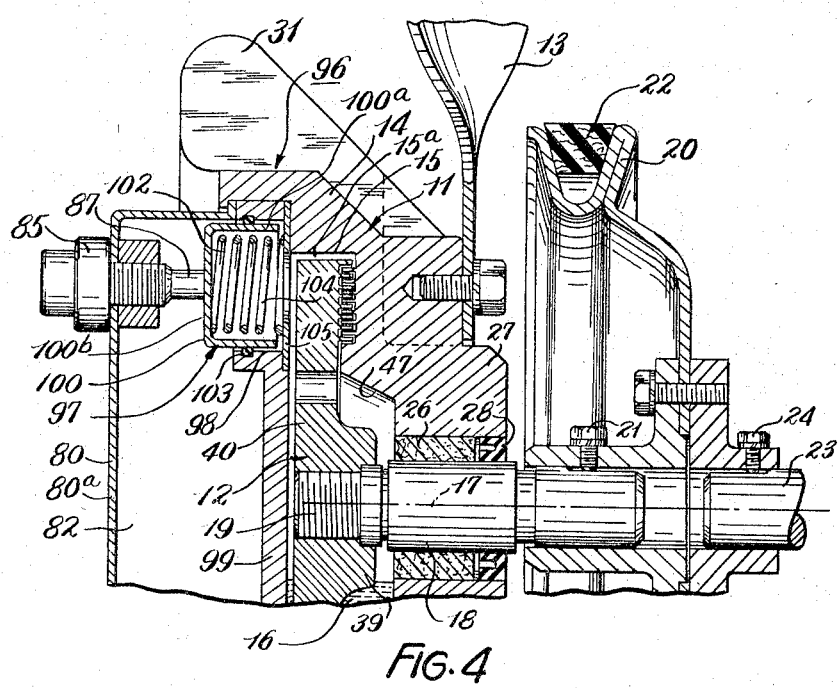

FIG. 4 of the drawings shows another coupling device 96 of a type and construction similar to the couplings 10 and 70 but representing another modified form of device. The coupling device 96 more closely resembles the coupling device 70 in that the transfer means 97 comprises cylinder devices located at spaced points around the rotation axis 17 and mounted in openings 98 of a transverse cover plate 99 of the housing 14.

The cylinder devices of the transfer means 97 each comprise a cup-shaped cylinder or piston member 100 having a cylindrical wall 100a slidably movable in one of the cover plate openings 98 and a transverse end wall 100b at the outer end thereof. The cylinder member 100 is open at the inner end thereof so that the chamber 102 of the cylinder member is in communication with the working chamber 15a of the housing 14. A suitable packing, such as a sealing ring 103, is located in the cover plate opening 98 and is in sealing engagement with the cylindrical wall 100a to prevent escape of fluid therealong.

The cylinder member 100 is movable in an outward or retracting direction in the opening 98 by a compression spring 104 located in the chamber 102 and having the outer end thereof in engagement with the transverse end wall 100b. The inner end of the spring is in engagement with a spring seat formed by an auxiliary plate 105 secured on the cover plate 99. The auxiliary plate 105 also forms a stop which is engageable by the inner end of the cylindrical wall 100a for limiting movement of the cylinder member 100 in an inward axial direction in the opening 98.

Associated with each of the cylinder members 97 is a thermostat unit 85 of the same form as already described above and whose actuating stem 87 is in engagement with the transverse end wall 100b. The cylinder devices 100, together with the compression springs 104 and the associated thermostat units 85, constitute the above-mentioned transfer means 97 which operates to vary the amount of fluid in the intervening space 35 between the ridge and groove elements 33 and 34 to correspondingly vary the amount of torque being transmitted from one to the other of the coupling members 11 and 12. This function is accomplished in the same manner as has been described above for the modified coupling device 70 with the exception that the cylinder devices 100 are not collapsible in the manner of the flexible bellows devices 93 but are slidable in the cover plate openings 98.

Figure 5:
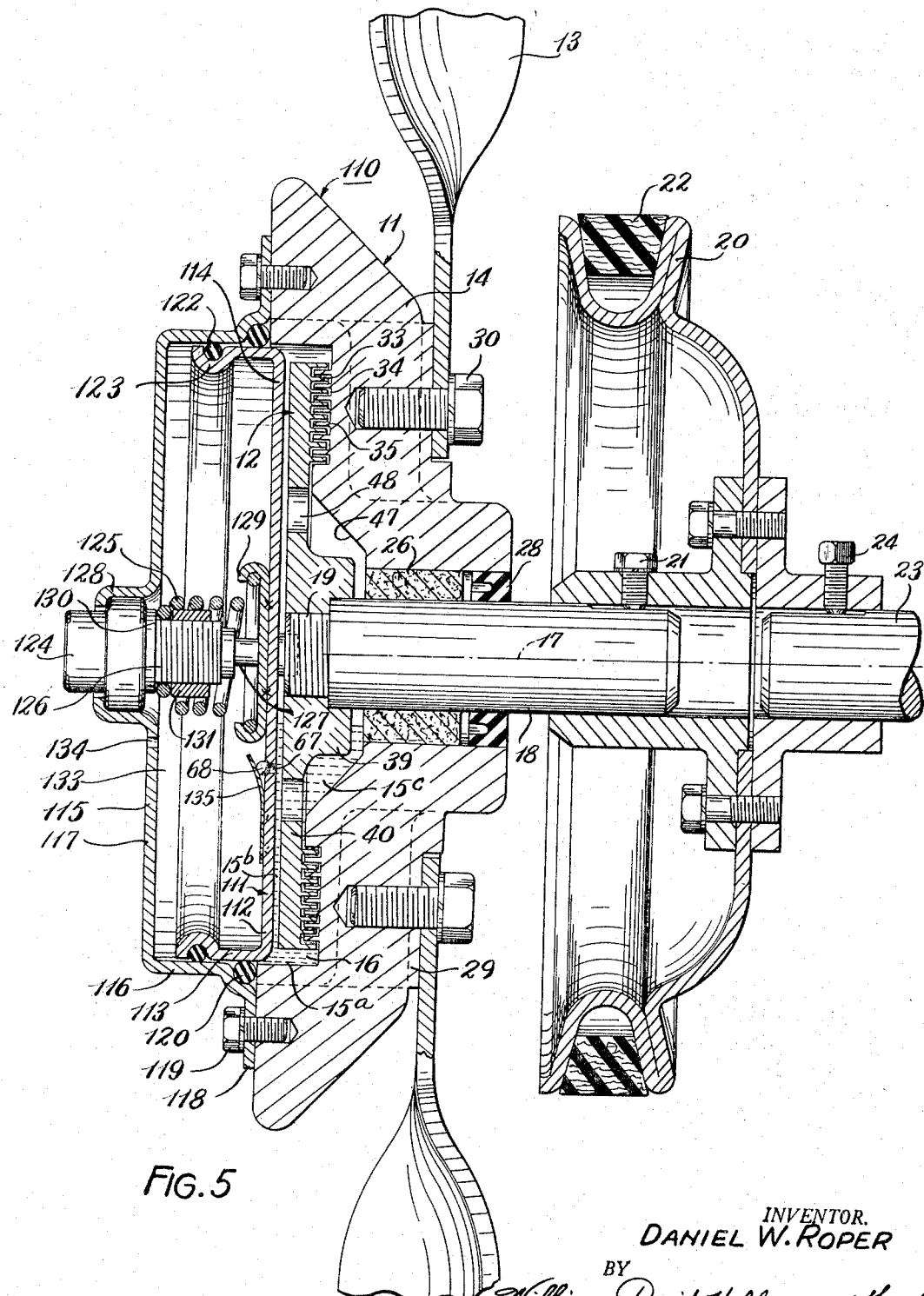
FIG. 5 is a vertical axial section similar to that of FIG. 1 but showing another modified form of the novel coupling device.

FIG. 5 of the drawings shows a coupling device 110 of a type similar to the coupling device 10 but which represents still another modified form of such device. The coupling device 110 comprises, in general, the same outer and inner coupling members 11 and 12 as the coupling device 10, and the same ridge and groove elements 33, 34 and intervening space 35 to which varying amounts of coupling fluid 16 are supplied for varying the amount of torque which is transmitted from one to the other of the coupling members. The coupling device 110 embodies transfer means 111 having a construction and manner of functioning somewhat similar to the transfer means 42 of the coupling device 10 but which comprises a slidable piston member 112 instead of a diaphragm type of piston means.

The piston member 112 is in the form of a cup-shaped member having a cylindrical side wall 113 and a transverse end wall 114, and is disposed with the transverse end wall located adjacent the inner coupling member 12 and the cylindrical side wall 113 extending in an outward axial direction therefrom.

To accommodate the piston member 112 the housing 14 is provided with a hollow cover member 115 having a cylindrical side wall 116 forming a cylinder member in which the piston member 112 is slidably movable. The cover member 115 also includes a transverse end wall 117 at the outer end of the cylindrical wall 116 and a mounting flange 118 projecting substantially radially from the cylindrical wall 116 at the inner end of the latter. The cover member 115 is attached to the housing 14 as by suitable clamping screws 119 extending into the housing through the flange 118. Leakage of fluid between the cover member 115 and the housing 14 is prevented by suitable sealing means, such as an annular packing ring 120, received between adjacent portions of the housing and cover member flange 118.

During the sliding movements of the piston member 112 in the cylindrical portion 116 of the cover member 115, the piston wall 113 is sealingly engaged by the packing 120 to prevent the escape of fluid along the piston. A further sealing co-operation is provided between the cylindrical portion 116 of the cover member 115 and the piston member 112 by a second packing ring 122 carried by the piston wall 113. The packing ring 122 is here shown received in the groove of a hollow bead portion 123 of the piston member.

An inward axial movement of the piston member 112 toward the right as seen in FIG. 5 will cause an increased amount of the coupling fluid 16 to enter the intervening space 35 to render the coupling elements 33, 34 effective to transmit an increased amount of torque between the coupling members 11 and 12. Conversely a retracting movement of the piston member 112 in an outward axial direction will result in a decrease in the amount of coupling fluid in the intervening space 35 and a corresponding decrease in the amount of torque being transmitted between the coupling members 11 and 12. Such retracting movement of the piston member 112 permits more or less of the fluid to be expelled from the intervening space 35 by centrifugal action on the fluid.

The actuating means for the piston member 112 comprises a thermostat unit 124 and an associated tension spring 125. The thermostat unit 124 includes a threaded stem 126 and a movable actuating stem 127 projecting from such threaded stem and having its inner end in engagement with the transverse wall 114 of the piston member 112. The thermostat unit 124 is located substantially centrally of the cover member 115 and is mounted and suitably secured in a hollow boss 128 thereof so that a substantial portion of the body of the thermostat unit will be outside of the housing 14.

The tension spring 125 is disposed around the inner portion of the thermostat unit 124 and has its inner end attached to the piston wall 114 by means of lug projections 129 of the latter. The outer end of the spring 125 is secured against a shoulder portion 130 of the thermostat unit by a clamping nut 131 applied to the threaded stem 126. The piston member 112, together with the tension spring 125 and the thermostat unit 124, constitute the transfer means 111 referred to above for causing variations in the amount of fluid 16 which is present in the intervening space 35 between the ridge and groove elements 33, 34.

A cool condition of the thermostat unit 124 will result in retraction of the piston member 112 by the spring 125 to permit centrifugal action to expel more or less of the fluid 16 from the intervening space 35, and a heated condition of the thermostat unit 124 will cause an inward movement of the piston 112 by the actuating stem 127 in opposition to the spring 125 to thereby cause more or less additional fluid to be supplied to the intervening space 35. The amount of fluid thus maintained in the intervening space 35 will determine the amount of torque transmitted from one to the other of the coupling members 11 and 12 so that the power output member, in this case the outer coupling member 11, and the cooling fan carried thereby will be rotatably driven at the appropriate speed.

The piston member 112 and the cover member 115 provide therebetween a chamber 133 in which the spring 125 is disposed and into which the inner end portion of the thermostat unit 124 projects. The chamber 133 is suitably vented to atmosphere as by a vent passage 134 in the cover member 115. The chamber means 15 of the housing 14 is provided with a pressure relief passage 67 and an associated valve member 68 similar to those of the coupling device 10 but in this case are located on the transverse wall of the piston member 112. A plate spring 135 acting on the valve member 68 maintains the same seated position during normal operating movements of the piston member 112 but permits unseating of the valve member if an excessive pressure occurs in the chamber means 15.

From the accompanying drawings and the foregoing detailed description it will now be readily understood that this invention provides different embodiments of a novel rotatable coupling device of the viscous shear fluid type which is of a simple construction but which will nevertheless be practical and reliable in operation and can be used to advantage for driving an engine auxiliary such as a cooling fan, or for driving various other kinds of load devices. By reason of the fluid transfer means embodied in the novel coupling device and effective on the coupling fluid for causing varying amounts of such fluid to be supplied to the coupling elements, an automatic control function of a modulating character will be achieved for the amount of torque to be transmitted from one to the other of the coupling members in accordance with the existing needs of the situation and the desired speed at which the load device is to be driven.

Although the novel coupling device of this invention has been illustrated and described herein to a somewhat detailed extent, it will be understood, of course, that the invention is not to be regarded as being limited correspondingly in scope but includes all changes and modifications coming within the terms of the claims hereof.

Having described my invention, I claim:

1. In a coupling of the viscous shear fluid type, a a pair of coupling members relatively rotatable on a common axis, one of said coupling members comprising housing means having a working chamber and the other of said coupling members being located in said chamber, said coupling members having spaced opposed surface portions defining a viscous fluid shear chamber therebetween and cooperable with shear fluid in said chamber to transmit torque between said members, said viscous shear chamber comprising a radially extending chamber of a substantially fixed volume, said housing means having an inner wall extending adjacent said other coupling member and an outer wall axially spaced from said inner wall, said inner wall having axially extending opening means communicating with said working chamber, cylinder means supported by said inner wall adjacent said opening means and movable axially in opposite directions relative to said inner wall to effect a variation in the radial extent of the shear fluid in said shear chamber thereby varying the coupling effect between said coupling members, and a temperature responsive means effective between said outer wall and said cylinder means for effecting axial movement of said cylinder means to increase the volume of shear fluid in said shear space upon an increase in temperature.

2. A fluid coupling as defined in claim 1 wherein said opening means comprises an annular group of openings spaced around said common axis and said cylinder means comprises an annular group of bellows devices connected with said inner wall at the locations of said openings, and said temperature responsive means comprises an annular group of temperature responsive devices mounted on said outer wall and having movable portions connected with the respective bellows devices.

3. A fluid coupling as defined in claim 1 wherein said opening means comprises an annular group of guide openings in said inner wall spaced around said common axis, and said cylinder means comprises an annular group of cup-shaped piston members movable in the respective guide openings, said temperature responsive means comprising an annular group of temperature responsive devices mounted on said outer wall and having movable portions connected with the respective piston members, and said guide openings being defined by a flange portion of said inner wall effective to guide the movement of said cup-shaped piston members and having a fluid seal between said flange portion and said piston members.

References Cited

UNITED STATES PATENTS

| | | | |
|---|---|---|---|
| 923,565 | 6/1909 | Newcomb | 192—58 |
| 1,862,802 | 6/1932 | Pope | 192—58 |
| 2,015,626 | 9/1935 | Heath | 192—58 X |
| 2,204,589 | 6/1940 | Haller | 192—58 X |
| 2,738,048 | 3/1956 | Douglas | 192—58 X |
| 2,838,244 | 6/1958 | Oldberg. | |
| 2,879,755 | 3/1959 | Weir | 192—58 |
| 2,948,268 | 8/1960 | Roper et al. | 192—58 X |
| 2,985,272 | 5/1961 | Sivacek | 192—58 |
| 2,988,188 | 6/1961 | Tauschek | 192—58 X |
| 3,011,607 | 12/1961 | Englander | 192—58 |
| 3,019,875 | 2/1962 | Fowler | 192—58 |

OTHER REFERENCES

The Magnet Fluid Clutch, Transactions of the A.I.E.E., 33 West 39th St., New York, N.Y., volume 67, Dec. 13, 1948, made available for printing Sept. 3, 1948, paper 48–238.

MARK NEWMAN, *Primary Examiner.*

DAVID J. WILLIAMOWSKI, THOMAS J. HICKEY,
*Examiners.*

H. D. COOPER, F. R. HANDREN, A. T. McKEON,
*Assistant Examiners.*